(12) United States Patent
Sakamoto et al.

(10) Patent No.: US 11,940,321 B2
(45) Date of Patent: Mar. 26, 2024

(54) PHOTODETECTION DEVICE AND LASER DEVICE

(71) Applicant: Fujikura Ltd., Tokyo (JP)

(72) Inventors: Shinichi Sakamoto, Chiba (JP); Wataru Kiyoyama, Chiba (JP)

(73) Assignee: Fujikura Ltd., Tokyo (JP)

( * ) Notice: Subject to any disclaimer, the term of this patent is extended or adjusted under 35 U.S.C. 154(b) by 642 days.

(21) Appl. No.: 17/254,485

(22) PCT Filed: Jun. 21, 2019

(86) PCT No.: PCT/JP2019/024740
§ 371 (c)(1),
(2) Date: Dec. 21, 2020

(87) PCT Pub. No.: WO2019/245032
PCT Pub. Date: Dec. 26, 2019

(65) Prior Publication Data
US 2021/0181015 A1 Jun. 17, 2021

(30) Foreign Application Priority Data
Jun. 22, 2018 (JP) ................. 2018-118956

(51) Int. Cl.
*G01J 1/42* (2006.01)
*G01J 1/04* (2006.01)
(Continued)

(52) U.S. Cl.
CPC ........... *G01J 1/4228* (2013.01); *G01J 1/0425* (2013.01); *G02B 6/4286* (2013.01);
(Continued)

(58) Field of Classification Search
CPC ...... G01J 1/4228; G01J 1/0425; G01J 1/1626; G02B 6/4286; G02B 6/2808; G02B 6/429;
(Continued)

(56) References Cited

U.S. PATENT DOCUMENTS 7,006,719 B2 * 2/2006 Joyner ................... G02B 6/132
385/129
8,548,017 B1 10/2013 O'Loughlin et al.
(Continued)

FOREIGN PATENT DOCUMENTS

| CN | 102044826 A | 5/2011 |
| CN | 104335018 A | 2/2015 |

(Continued)

OTHER PUBLICATIONS

International Search Report issued in corresponding International Application No. PCT/JP2019/024740 dated Sep. 17, 2019 (2 pages).

*Primary Examiner* — Michelle M Iacoletti
*Assistant Examiner* — Noah J. Haney
(74) *Attorney, Agent, or Firm* — Osha Bergman Watanabe & Burton LLP

(57) ABSTRACT

A photodetection device including: first optical fibers; a second optical fiber; an optical combiner having: an end face connected to an end face of each of the first optical fibers; and another end face connected to an end face of the second optical fiber; a first photodetector that detects an intensity of light propagating through at least one of the first optical fibers; a second photodetector that detects Rayleigh scattering of light propagating through the second optical fiber; and a calculator that calculates the intensity of light propagating in a predetermined direction through the first optical fibers
(Continued)

or the second optical fiber, from a result of detection by the first photodetector and a result of detection by the second photodetector.

5 Claims, 5 Drawing Sheets

(51) Int. Cl.
  *G02B 6/42*   (2006.01)
  *H01S 3/13*   (2006.01)
  *H01S 3/23*   (2006.01)
  *G02B 6/28*   (2006.01)
  *H01S 3/00*   (2006.01)

(52) U.S. Cl.
  CPC .......... *H01S 3/1306* (2013.01); *H01S 3/2383* (2013.01); *G02B 6/2808* (2013.01); *G02B 6/429* (2013.01); *H01S 3/0014* (2013.01); *H01S 3/1305* (2013.01)

(58) Field of Classification Search
  CPC .......... G02B 6/24; G02B 6/42; H01S 3/0014; H01S 3/1306; H01S 3/2383; H01S 3/1305
  USPC ........................................... 356/222
  See application file for complete search history.

(56) References Cited

U.S. PATENT DOCUMENTS

| | | | |
|---|---|---|---|
| 9,136,663 B2* | 9/2015 | Taya | H01S 3/06708 |
| 2014/0205236 A1* | 7/2014 | Noguchi | G02B 6/32 |
| | | | 385/33 |
| 2014/0241663 A1 | 8/2014 | Fomin et al. | |
| 2014/0313513 A1 | 10/2014 | Liao | |
| 2015/0055916 A1* | 2/2015 | Tanaka | G02B 6/0028 |
| | | | 385/43 |
| 2016/0359288 A1 | 12/2016 | Matsuoka | |
| 2017/0194760 A1* | 7/2017 | Kanskar | G02B 6/2821 |

FOREIGN PATENT DOCUMENTS

| | | | | | |
|---|---|---|---|---|---|
| CN | 104713643 A | | 6/2015 | | |
| CN | 104836099 A | | 8/2015 | | |
| CN | 105026969 A | | 11/2015 | | |
| CN | 105953916 A | | 9/2016 | | |
| CN | 106063055 A | | 10/2016 | | |
| DE | 102006052255 A1 | * | 5/2008 | .......... | G02B 6/2808 |
| JP | 2013197332 A | * | 9/2013 | .......... | H01S 3/13 |
| JP | WO2012/073952 A1 | | 5/2014 | | |
| JP | 2015-159208 A | | 9/2015 | | |
| JP | 2015-525342 A | | 9/2015 | | |
| JP | 2016-161867 A | | 9/2016 | | |
| JP | 2016161867 A | * | 9/2016 | .......... | G02B 6/42 |
| JP | 2017-084964 A | | 5/2017 | | |
| JP | 2017-116465 A | | 6/2017 | | |
| JP | 2017-518482 A | | 7/2017 | | |
| JP | 2017-208370 A | | 11/2017 | | |
| JP | 2017-224678 A | | 12/2017 | | |
| JP | 2018-004770 A | | 1/2018 | | |
| JP | 2018-82045 A | | 5/2018 | | |
| JP | 2019-70598 A | | 5/2019 | | |
| KR | 101826500 B1 | | 2/2018 | | |
| WO | 2012/073952 A1 | | 6/2012 | | |
| WO | 2014/035505 A2 | | 3/2014 | | |
| WO | 2015/072198 A1 | | 5/2015 | | |
| WO | 2017/199508 A1 | | 11/2017 | | |

* cited by examiner

PHOTODETECTION DEVICE AND LASER DEVICE

CROSS-REFERENCE TO RELATED APPLICATIONS

The present application claims priority from International Patent Application No. PCT/JP2019/024740 filed. Jun. 21, 2019, which claims priority from Japanese Patent Application No. 2018-118956 filed Jun. 22, 2018. The contents of both applications are incorporated herein in their entirety.

TECHNICAL FIELD

The present invention relates to a photodetection device and a laser device equipped with the photodetection device.

BACKGROUND

Fiber laser devices are used in various fields such as the field of laser machining and the field of medical care because such fiber laser device has excellent light gathering performance and a high power density, and provides the light having a small beam spot. In order to achieve good processing quality with such highly efficient laser device, the intensity of light propagating through an optical fiber needs to be accurately detected.

For example, Patent Literature 1 listed below describes a fiber laser device that estimates the intensity of light propagating through an optical fiber by detecting the light leaking from a joint between optical fibers. Patent Literature 2 listed below describes a sensor unit that estimates the intensity of light propagating through an optical fiber by detecting Rayleigh scattering of light propagating through the optical fiber.

[Patent Literature 1] WO 2012/073952 A1
[Patent Literature 2] WO 2014/035505 A2

The fiber laser device described in Patent Literature 1 listed above uses the light leaking from a joint between optical fibers, and the leaking light generates heat when taken out of an optical fiber. Such heat generation is more noticeable as the light propagating through an optical fiber has higher energy. Therefore, in the fiber laser device described in Patent Literature 1 listed above, the detector and a path to the detector are more affected by heat as the light propagating through an optical fiber has higher energy, and the relationship between a detection result and an intensity of light propagating through an optical fiber, which is estimated from the detection result, tends to be less linear. As a result, it can be difficult to accurately detect the intensity of light propagating through an optical fiber.

The sensor unit described in Patent literature 2 listed above detects Rayleigh scattering of light propagating through an optical fiber. However, it is difficult to determine in which direction the light for Rayleigh scattering is propagating through an optical fiber since Rayleigh scattering occurs in all directions. Therefore, it is difficult for the sensor unit described in Patent Literature 2 listed above to accurately detect the intensity of the light propagating in a predetermined direction through an optical fiber. In particular, it is more difficult to accurately detect the intensity of the light propagating in a predetermined direction through an optical fiber in processing a highly reflective material such as metal working because a reflective light that propagates in a direction opposite to the direction of the output laser can produce.

SUMMARY

Accordingly, one or more embodiments of the present invention provide a photodetection device being capable of improving the accuracy of detection of the intensity of the light propagating in a predetermined direction through an optical fiber, and a laser device equipped with the photodetection device, the photodetection device.

A photodetection device according to one or more embodiments of the present invention comprises: a plurality of first optical fibers; an optical combiner having one end face to which one end face of each of she first optical fibers is connected; a second optical fiber having one end face to which the other end face of the optical combiner is connected; a first photodetector that detects an intensity of light propagating through at least one of the first optical fibers; a second photodetector that detects Rayleigh scattering of light propagating through the second optical fiber; and a calculation unit (calculator) that calculates the intensity of light propagating in a predetermined direction through the first optical fibers or the second optical fiber, from a result of detection by the first photodetector and a result of detection by the second photodetector.

In the photodetection device of the present invention, a plurality of first optical fibers are connected to one end face of the optical combiner, and the second optical fiber is connected to the other end face of the optical combiner. When the plurality of first optical fibers and the second optical fiber are optically coupled via the optical combiner in this way, a difference arises between the ratio of the light propagating from the plurality of the first optical fibers to the second optical fiber and the ratio of the light propagating from the second optical fiber to the plurality of the first optical fibers. In other words, it is easier to propagate light from an end face of the optical combiner, which is connected to the second optical fiber, to the core of the second optical fiber, whereas it is difficult to propagate light from an end face of the optical combiner, which is connected to the first optical fibers, to the cores of the first optical fibers. This is conceivably because the light coming from the second optical fiber side is incident on a gap between the adjacent first optical fibers on the end face of the optical combiner and on the claddings of the first optical fibers when the plurality of first optical fibers is connected to an end face of the optical combiner. Meanwhile, the first photodetector detects the intensity of the light propagating through at least one of the first optical fibers. In the case where light propagates through the plurality of first optical fibers, if the intensity of the light propagating through at least one of the first optical fibers is known, the intensity of the light propagating through the plurality of the first optical fibers can be estimated by totalizing the intensities. The second photodetector detects the intensity of the light propagating through the second optical fiber by detecting Rayleigh scattering of the light propagating through the second optical fibers. Because of the aforementioned difference between the ratios, a difference in detection result arises between the first photodetector and the second photodetector, which are placed to sandwich the optical combiner as described above. The difference in detection result is dependent on the intensity of the light propagating from the first optical fibers toward the second optical fiber and on the intensity of the light propagating from the second optical fiber toward the first optical fibers. Therefore, the calculation unit can calculate the intensity of the light propagating from the first optical fibers toward the second optical fiber or the intensity of the light propagating from the second optical fiber toward the first optical fibers, from the result of detection by the first photodetector and the result of detection by the second photodetector. That is, the calculation unit can calculate the intensity of the light propagating through the first optical fibers or through the second optical fiber in a predetermined direction.

In addition, in the photodetection device of the present invention, at least the second photodetector detects Rayleigh scattering. Therefore, as compared with the case where leaked light is detected as in the fiber laser device described in Patent Literature 1 above, the relationship between a detection result and an intensity of light propagating through the second optical fiber estimated from the detection result can be kept linear even when the light propagating through the second optical fiber has a high intensity. Note that the method for detecting the intensity of the light propagating through the first optical fiber by using the first photodetector is not particularly limited. The light propagating through the plurality of first optical fibers is incident on the second optical fibers, whereas the light propagating through each of the first optical fibers has a lower intensity than the light propagating through the second optical fiber. Accordingly, even in the case where, for example, the first photodetector detects leaked light, the relationship between a detection result and an intensity of light propagating through the first optical fiber estimated from the detection result is more likely to be kept linear. Therefore, the photodetection device of the present invention can improve the accuracy of detecting the intensity of light propagating through an optical fiber in a predetermined direction.

In addition, in one or more embodiments, the first photodetector detects the intensity of the light propagating through all the first optical fibers.

As described above, the first photodetector detects the intensity of the light propagating through at least one of the first optical fibers, so that the intensity of the light propagating through the plurality of first optical fibers can be estimated. However, in the case where light propagates through the plurality of first optical fibers, the first photodetector detecting the intensity of the light propagating through all the first optical fibers eliminates the need for estimating the intensity of the light propagating through the plurality of first optical fibers as described above, and it is made easier to detect the intensity of the light propagating through the plurality of first optical fibers. In addition, if the first optical fiber is very thin relative to the size of the sensor used as the first photodetector, arranging the plurality of first optical fibers in parallel allows a single sensor to detect the intensity of the light propagating through all the first optical fibers, and the sensor can be disposed easily.

Furthermore, in one or more embodiments, a light source is optically coupled to the other end face of each of some first optical fibers among a plurality of the first optical fibers, the light source is non-connected to the other end face of each of some other first optical fibers among a plurality of the first optical fibers, and the first photodetector detects the intensity of the light propagating through the first optical fibers that are non-connected to the light source.

In the case where the light source is optically coupled to the other end face of each of some first optical fibers among the plurality of first optical fibers and the light source emits light, only the light coming from the second optical fiber side propagated through the first optical fiber that is non-connected to the light source. In this case, the second photodetector detects the intensity of the light propagating in both directions through the second optical fiber, whereas the first photodetector detects the intensity of the light propagating from the second optical fiber side through the first optical fiber. Therefore, it is made easier to calculate the intensity of the light propagating in a predetermined direction through the first optical fiber and the second optical fiber, from a difference between a result of detection by the first photodetector and a result of detection by the second photodetector.

In one or more embodiments, the first photodetector detects the intensity of the light emitted from the other end face of the first optical fiber that is non-connected to the light source.

Through detection of the intensity of the light emitted from the end face of the first optical fiber, it is made easier to accurately detect the intensity of the light propagating from the second optical fiber side through the first optical fiber.

Furthermore, in one or more embodiments, light sources are each optically coupled to the other end face of each of the first optical fibers, each of the light sources is switched between a light emission state and a light non-emission state, and the first photodetector detects, when at least one of the light sources is in the light emission state, the intensity of the light propagating through the first optical fibers optically coupled to the light sources that are in the light non-emission state.

In the case where light sources are each optically coupled to the other end face of each of the first optical fibers and each of the light sources is switched between the light emission state and the light non-emission state, it is assumed that at least one of the light sources emits light while the other light sources do not emit light. Then, among the plurality of first optical fibers, some first optical fibers are in the state in which light is propagated toward the optical combiner while some other first optical fibers are in the state in which light is not propagated toward the optical combiner. In this case, the first optical fiber that is optically coupled to the light source in the light non-emission state does not propagate light toward the optical combiner but only propagates the light coming from the second optical fiber side. The first photodetector detects the intensity of the light propagating through the first optical fiber that is not propagating any light toward the optical combiner, so that the first photodetector detects the intensity of the light propagating from the second optical fiber side through the first optical fiber. Therefore, it is made easier to calculate the intensity of the light propagating in a predetermined direction through the first optical fiber and the second optical fiber, from a difference between a result of detection by the first photodetector and a result of detection by the second photodetector.

Furthermore, in one or more embodiments, the cladding mode stripper is provided on the second optical fiber, and the second photodetector is disposed closer to the optical combiner than the cladding mode stripper.

The ratio of the cladding mode light to the light that is emitted from the second optical fiber and returns to the second optical fiber is indefinite, and thus the cladding mode light may constitute an uncertainty in a result of detection by the second photodetector. Since the second photodetector is provided closer to the optical combiner than the cladding mode stripper, the cladding mode light out of the light that is emitted from the second optical fiber and returns to the second optical fiber can be released to the outside of the second optical fiber by the cladding mode stripper. Therefore, it can be easier for the second photodetector to accurately detect the intensity of the light propagating through the second optical fiber.

Furthermore, a laser device according to one or more embodiments of the present invention comprises: any one of the above-described photodetection devices; and a light source that emits light to be incident on the other end face of at least one of the first optical fibers.

As described above, the photodetection device of the present invention can improve the accuracy of detecting the intensity of light propagating through an optical fiber in a predetermined direction. Therefore, the laser device equipped with the photodetection device can improve the accuracy of the control based on the intensity of light propagating through an optical fiber.

As described above, the present invention provides a photodetection device and a laser device equipped with the photodetection device, the photodetection device being capable of achieving higher accuracy of detecting the intensity of light propagating through an optical fiber in a predetermined direction.

DETAILED DESCRIPTION

The photodetection device and the laser device according to one or more embodiments of the present invention will now be described in detail with reference to the drawings.

First Embodiment

Figure 1:
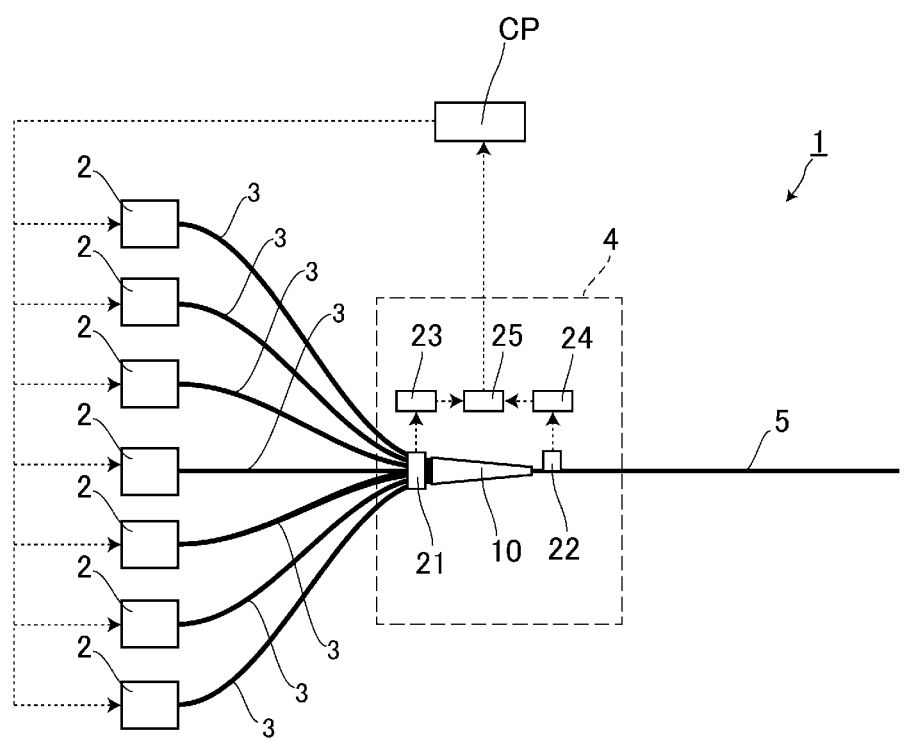
FIG. 1 is a diagram schematically illustrating a laser device according to a first embodiment of the present invention.

FIG. 1 is a diagram schematically illustrating a laser device according to a first embodiment of the present invention. As illustrated in FIG. 1, a laser device 1 of the present embodiment includes, as main components, a plurality of light sources 2, a plurality of first optical fibers 3, a photodetection device 4, a second optical fiber 5, and a control unit CP.

Each of the light sources 2 is a laser device that emits signal light having a predetermined wavelength, such as, for example, a fiber laser device or a solid-state laser device. In the case where the light sources 2 are fiber laser devices, the fiber laser devices may be resonator type fiber laser devices or may be master oscillator power amplifier (MO-PA) type fiber laser devices. The light emitted from each of the light sources 2 may be, for example, the light having a wavelength of 1070 nm. Each of the light sources 2 is connected to the first optical fiber 3 that propagates the light emitted from the light source 2.

One end face of each of the first optical fiber 3 is connected to one end face of an optical combiner 10, and the other end face of the first optical fiber 3 is optically coupled to the light source 2. Accordingly, the first optical fiber 3 is an input optical fiber for inputting the light emitted by the light source 2 to the optical combiner 10.

Figure 2:
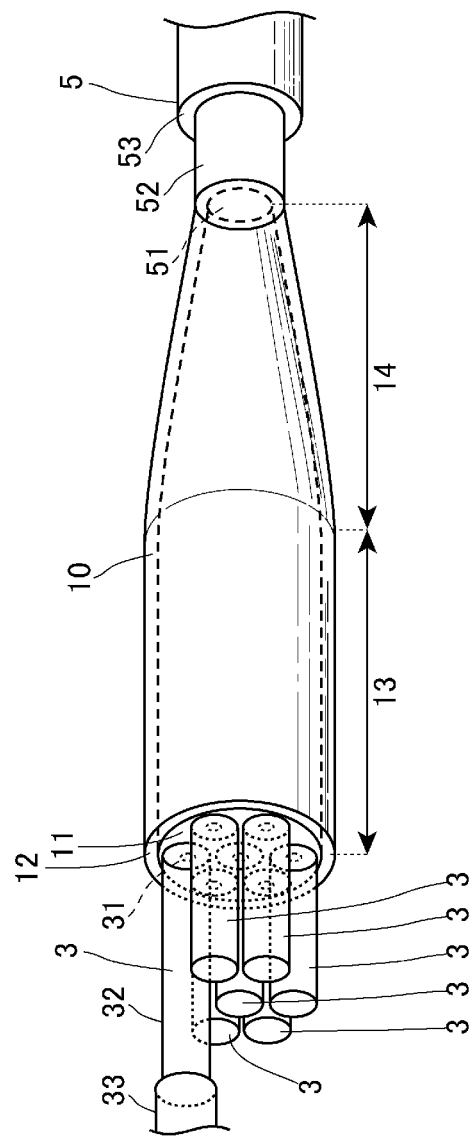
FIG. 2 is an enlarged perspective view of the joint between the optical fibers and the optical combiner shown in FIG. 1.

FIG. 2 is an enlarged perspective view of the joint between the optical fibers and the optical combiner shown in FIG. 1.

As shown in FIG. 2, in the present embodiment, one of the first optical fibers 3 is connected to the optical combiner 10 at the center of one end face of the optical combiner 10. The other six first optical fibers 3 are disposed around the one first optical fiber 3 to be connected to the one end face of the optical combiner 10.

Each of the first optical fibers 3 includes a core 31, a cladding 32 surrounding the core 31, and a coating layer 33 covering the outer perimeter surface of the cladding 32. Note that FIG. 2 shows, for convenience, the coating layer 33 of one of the first optical fibers 3 only, while the other first optical fibers 3 are cut on the side opposite to the optical combiner 10. In addition, the coating layer 33 of each first optical fiber 3 is peeled off at one end on the optical combiner 10 side.

In the first optical fiber 3, the core 31 has a higher refractive index than the refractive index of the cladding 32. For example, the core 31 is formed of the quartz to which a dopant such as germanium (Ge) for increasing the refractive index is added, while the cladding 32 is formed of pure quartz. Alternatively, the core 31 may be formed of pure quartz to which no dopant is added, while the cladding 32 may be formed of the quartz to which a dopant such as fluorine (F) for decreasing the refractive index is added. The coating layer 33 is made of a material having a refractive index lower than the refractive index of the cladding 32. Examples of the material contained in the coating layer 33 include an ultraviolet curable resin.

Figure 3:
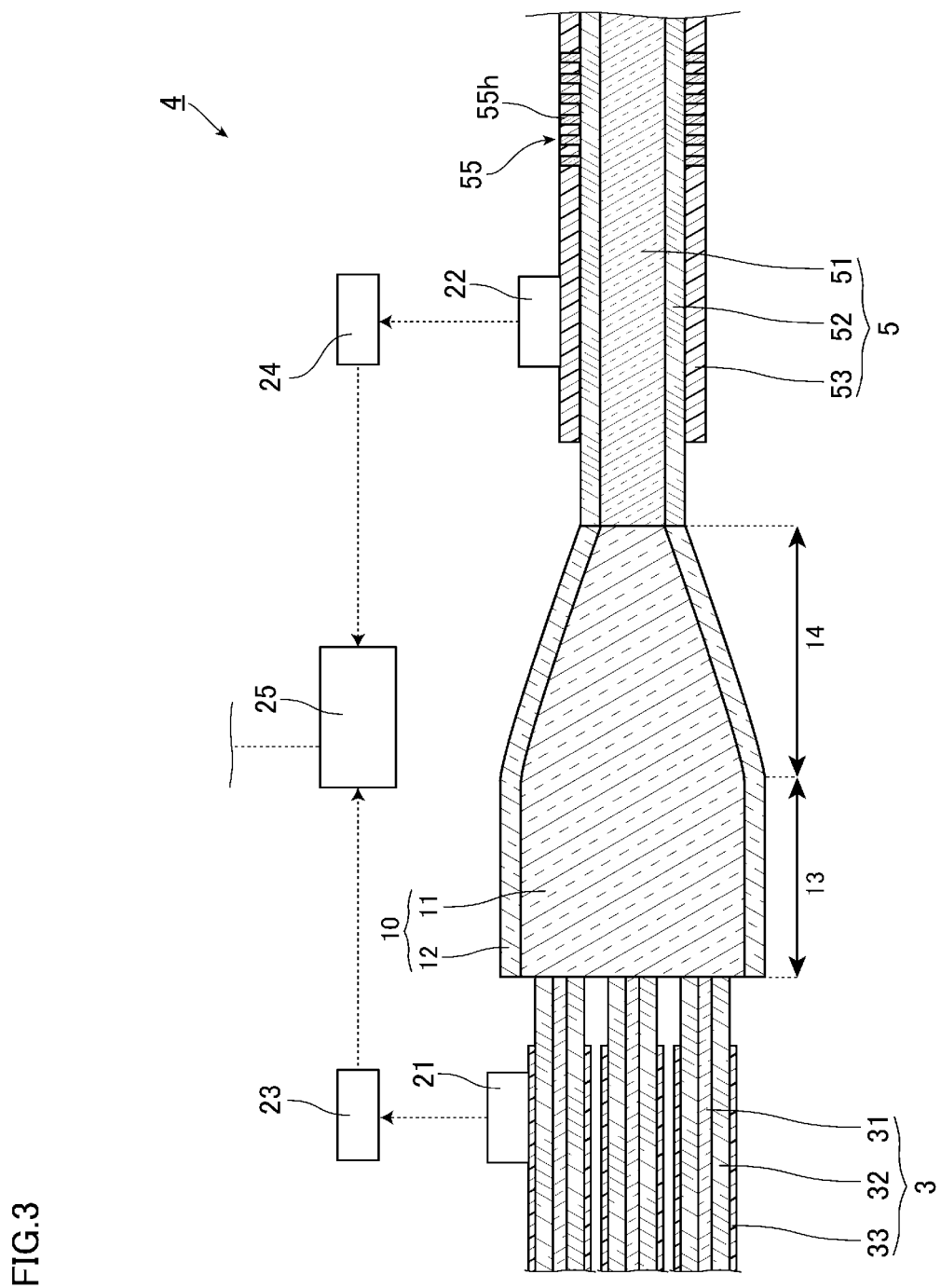
FIG. 3 is a schematic cross-sectional view of the photodetection device shown in FIG. 1.

FIG. 3 is a schematic cross-sectional view of the photodetection device shown in FIG. 1. As illustrated in FIG. 3, the photodetection device 1 according to the present embodiment includes, as main components, the plurality of first optical fibers 3, the optical combiner 10, the second optical fiber 5, a first photodetector 21, a second photodetector 22, a first AD conversion unit 23, a second AD conversion unit 24, and a calculation unit 25.

The optical combiner 10 of the present embodiment is a tapered fiber in which a part of the optical combiner 10 on the first optical fiber 3 side has an unvarying outer diameter while another part of the optical combiner 10 on the second optical fiber 5 side has an outer diameter being gradually reduced. That is, the optical combiner 10 includes a non-reduced diameter portion 13 that has an unvarying outer diameter and a tapered portion 14 that is formed integrally with the non-reduced diameter portion 13 and has an outer diameter gradually reduced further away from the non-reduced diameter portion 13. In the optical combiner 10, one end face on the non-reduced diameter portion 13 side and one end face of each first optical fiber 3 are fusion spliced, while the other end face on the tapered portion 14 side and one end face of the second optical fiber 5 are fusion spliced.

The optical combiner 10 of the present embodiment has a core-cladding structure. That is, the optical combiner 10 of the present embodiment includes a core 11 in which the plurality of first optical fibers 3 and the second optical fiber 5 are optically image-formed, and a cladding 12 that has a refractive index lower than the refractive index of the core 11 and surrounds the core 11. The refractive index of the optical combiner 10 is not particularly limited; however, from the viewpoint of suppressing the reflection of the light incident on the core 11 of the optical combiner 10 from the first optical fiber 3, the core 11 has a refractive index approximately equal to the refractive index of the central axis and its surrounding of the first optical fiber 3. For example, the core 11 of the optical combiner 10 is made of a material similar to the material of the core 31 of the first optical fiber 3, and the cladding 12 of the optical combiner 10 is made of a material similar to the material of the cladding 32 of the first optical fiber 3.

However, the optical combiner 10 may not necessarily have a core-cladding structure, and the entirety of the optical combiner 10 may be a portion that propagates light. In this case, the entirety of the optical combiner 10 can be regarded as the core 11, and the air around the optical combiner 10 can be regarded as a cladding. Furthermore, in this case, the entirety of the optical combiner 10 is formed of, for example, a material similar to the material of the core 31 of the first optical fiber 3.

Note that the first optical fiber 3 included in the photodetection device 4 may be part of the first optical fiber 3 optically coupled to the light source 2, or may be another optical fiber that is optically coupled to the first optical fiber 3 and has a configuration similar to the configuration of the first optical fiber 3.

The second optical fiber 5 is an output optical fiber for outputting the light emitted from the optical combiner 10 to the subsequent stage. The second optical fiber 5 includes a core 51, a cladding 52 surrounding the core 51, and a coating layer 53 covering the outer perimeter surface of the cladding 52. For example, the core 51 of the second optical fiber 5 is made of a material similar to the material of the core 31 of the first optical fiber 3, the cladding 52 of the second optical fiber 5 is made of a material similar to the material of the cladding 32 of the first optical fiber 3, and the coating layer 53 of the second optical fiber 5 is made of a material similar to the material of the coating layer 33 of the first optical fiber 3. In addition, the second optical fiber 5 of the present embodiment is a multimode fiber.

In the present embodiment, the core 51 of the second optical fiber 5 has a diameter equal to the diameter of an end face of the core 11 of the optical combiner 10 on the tapered portion 14 side, and the cladding 52 of the second optical fiber 5 has an outer diameter equal to the outer diameter of an end face of the cladding 12 of the optical combiner 10 on the tapered portion 14 side. In addition, the end face of the second optical fiber 5 and the corresponding end face of the optical combiner 10 are fusion spliced such that their central axes are aligned with each other. Note that the coating layer 53 of the second optical fiber 5 is peeled off in the vicinity of the end face to be fusion spliced to the optical combiner 10.

Furthermore, the second optical fiber 5 of the present embodiment includes a cladding mode stripper 55. The cladding mode stripper 55 is disposed on the outside of the cladding 52 of the second optical fiber 5. The cladding mode stripper 55 is not particularly limited as long as it is configured to release the cladding mode light propagating through the cladding 52 out of the second optical fiber 5. The cladding mode stripper 55 of the present embodiment is formed by separately providing a plurality of high refractive index portions 55*h* outside the cladding 52. The high refractive index portions 55*h* is made of a resin having a refractive index higher than the refractive index of the cladding 52.

Note that in FIG. 1, nothing is connected to the end face of the second optical fiber 5 on the side opposite to the optical combiner 10; however, another optical fiber, a glass rod having a diameter larger than the diameter of the core 51 of the second optical fiber 5, or the like may be connected to the end face of the second optical fiber 5 on the side opposite to the optical combiner 10.

The first photodetector 21 is disposed upstream of the optical combiner 10 with respect to the direction in which the light from the light source 2 propagates, while the second photodetector 22 is disposed downstream of the optical combiner 10 with respect to the direction in which the light from the light source 2 propagates. In the present embodiment, the first photodetector 21 is disposed on the outside of one of the first optical fibers 3 to detect Rayleigh scattering of the light propagating through the one first optical fiber 3. The second photodetector 22 is disposed on the outside of the second optical fiber 5 to detect Rayleigh scattering of the light propagating through the second optical fiber 5. Each of the first photodetector 21 and the second photodetector 22 is formed of, for example, a photodiode.

In addition, the second photodetector 22 of the present embodiment is disposed closes to the optical combiner 10 than the cladding mode stripper 55 and is thermally separated from the cladding mode stripper 55. The second photodetector 22 is disposed to be thermally separated from the cladding mode stripper 55, whereby the second photodetector 22 can be less affected by the heat generated by the cladding mode stripper 55.

Note that since Rayleigh scattering occurs in all directions, it is difficult to determine in which direction the light for Rayleigh scattering is propagating through an optical fiber by simply detecting Rayleigh scattering. For example, in cases where the laser device 1 is used for processing a highly reflective material such as metal working, the reflected light that propagates in a direction opposite to the emission direction in which the light is emitted from the second optical fiber 5 may propagate through the second optical fiber 5. For such cases, the photodetection device 4 of the present embodiment can improve the accuracy of detecting the intensities of the light propagating in both directions through the first optical fiber 3 and the light propagating in both directions through the second optical fiber 5, as will be described later in detail.

The first AD conversion unit 23 performs AD conversion on a signal from the first photodetector 21 and sends the resulting signal to the calculation unit 25. The second AD conversion unit 24 performs AD conversion on a signal from the second photodetector 22 and sends the resulting signal to the calculation unit 25.

As described later, the calculation unit 25 estimates the intensity of the light propagating through the first optical fiber 3 and the intensity of the light propagating through the second optical fiber 5, through a calculation based on the result of detection by the first photodetector 21 as sent via the first AD conversion unit 23 and the result of detection by the second photodetector 22 as sent via the second AD conversion unit 24.

The control unit CP shown in FIG. 1 controls the light source 2 on the basis of a signal from the calculation unit 25, as described later. Note that the calculation unit 25, the first AD conversion unit 23, and the second AD conversion unit 24 may be part of the control unit CP. That is, at least one of the calculation unit 25, the first AD conversion unit 23, and the second AD conversion unit 24 may be integrated with the control unit CP through the use of a single CPU.

The following describes operations and actions of the laser device 1 and the photodetection device 4 of the present embodiment.

First, when light is emitted from the individual light sources 2, the light is incident on the core 11 from one end face of the optical combiner 10 via the first optical fibers 3.

The light incident on the core 11 of the optical combiner from the first optical fibers 3 reaches the tapered portion 11 of the optical combiner 10. In the tapered portion 14, at least part of the light propagates while being reflected on the interface between the core 11 and the cladding 12 of the optical combiner 10. Every time the reflection is repeated, the divergence angle of the light is increased by the outer perimeter surface of the core 11 of the tapered optical combiner 10. That is, the light reflected on the outer perimeter surface of the core 11 of the optical combiner 10 forms an increasingly large angle with the axial direction of the optical combiner 10. Then, the light propagating through the tapered portion 14 is emitted at a predetermined divergence angle from the emission face of the optical combiner 10, which is the end face of the optical combiner 10 on the tapered portion 14 side, and enters the core 51 from one end face of the second optical fiber 5 to propagate through the second optical fiber 5. In this way, the light emitted from the light sources 2 sequentially propagates through the first optical fibers 3, the optical combiner 10, and the second optical fiber 5, and is emitted from the other end face of the second optical fiber 5.

The light emitted from the other end face of the second optical fiber 5 as described above is applied to a workpiece or the like. Furthermore, part of the light applied to the workpiece or the like may be reflected on a surface of the workpiece or like, and part of the reflected light may further return to the second optical fiber 5. In the following description, the direction from the first optical fibers 3 toward the second optical fiber 5 may be referred to as the forward direction, while the direction from the second optical fiber 5 toward the first optical fibers 3 may be referred to as the reverse direction.

The light that propagates through the individual first optical fibers 3 in the forward direction is caused to be efficiently incident on the second optical fiber 5 by the optical combiner 10. Therefore, the following calculation ignores loss of the light propagating in the forward direction through the first optical fibers 3. Letting Pf be the intensity of light propagating in the forward direction through the first optical fiber 3, and letting Pr be the intensity of light propagating in the reverse direction through the second optical fiber 5, the intensity M2 of light obtained from Rayleigh scattering detected by the second photodetector 22 can be expressed by the following equation (1):

$$M2=NPf+Pr \quad (1)$$

where N is the number of the first optical fibers 3 propagating the light from the light sources 2. In the present embodiment, N=7 on the assumption that the light sources 2 are connected to all of the first optical fibers 3 and the light from the light sources 2 propagates through all of the first optical fibers 3. Note that it is assumed here that the light with substantially the same intensity propagates from the light source 2 through every first optical fiber 3; however, if the intensity of the light differs among the first optical fibers 3 through which the light propagates, a calculation may be done by multiplying Pf by an appropriate coefficient.

On the other hand, part of the light propagating in the reverse direction through the second optical fiber 5 may be incident on the first optical fibers 3 through the optical combiner 10, but the other part of the light is not incident on the first optical fibers 3. Accordingly, letting $\alpha$ be the ratio of the light incident on the first optical fiber 3 to the light propagating in the reverse direction through the second optical fiber 5, the intensity M1 of light obtained from Rayleigh scattering detected by the first photodetector 21 can be expressed by the following equation (2). That is, the intensity of the light propagating in the reverse direction through the first optical fiber 3 can be denoted as $\alpha$Pr.

$$M1=Pt+\alpha Pr \quad (2)$$

The result of detection by the first photodetector 21 is input to the calculation unit 25 through the first AD conversion unit 23, while the result of detection by the second photodetector 22 is input to the calculation unit 25 through the second AD conversion unit 24. Then, the calculation unit 25 performs calculations in accordance with the equations (1) and (2) above. Furthermore, from the equations (1) and (2) above, the intensity Pf of the light propagating in the forward direction through the first optical fiber 3 and the intensity Pr of the light propagating in the reverse direction through the second optical fiber 5 are calculated as in the following equations (3) and (4).

$$Pr=(M2-NM1)/(1-N\alpha) \quad (3)$$

$$Pf=(\alpha M2-M1)/(N\alpha-1) \quad (4)$$

The value of $\alpha$ above can be obtained by conducting a test in advance in which light is propagated in the reverse direction through the first optical fiber 3 and the second optical fiber 5. Specifically, first, a calorimeter is disposed for measuring the energy of light emitted from the end face of the first optical fiber 3 on the upstream side. Then, light is propagated in the reverse direction from the second optical fiber 5 on the downstream side, and $\alpha$ can be defined as the ratio between the energy of the light thus caused to enter the second optical fiber 5 and the energy measured by the calorimeter.

In addition, in order to take into account any loss of the light propagating in the forward direction through the first optical fiber 3, caused between the point where the intensity is detected by the first photodetector 21 and the point where the intensity detected by the second photodetector 22, the following consideration can be given. The light intensity M2 obtained from Rayleigh scattering detected by the second photodetector 22 can be expressed by the following equation (5). In the equation, $\beta$ is the ratio of the light that propagates in the forward direction from the point where the intensity is detected by the first photodetector 21 to the point where the intensity is detected by the second photodetector 22. That is, the intensity of the light propagating in the forward direction through the second optical fiber 5 can be denoted as N$\beta$Pf.

$$M2=N\beta Pf+Pr \quad (5)$$

Then, from the equations (2) and (5) above, the intensity Pf of the light propagating in the forward direction through the first optical fiber 3 and the intensity Pr of the light propagating in the reverse direction through the second optical fiber 5 are calculated as in the following equations (6) and (7).

$$Pr=(N\beta M1-M2)/(N\alpha\beta-1)\ldots \quad (6)$$

$$Pf=(\alpha M2-M1)/(N\alpha\beta-1)\ldots \quad (7)$$

The value of $\beta$ above can be obtained by conducting a test in advance in which light is propagated in the forward direction through the first optical fiber 3 and the second optical fiber 5. Specifically, first, a calorimeter is disposed for measuring the energy of light emitted from the end face of the second optical fiber 5 on she downstream side. Then, light is propagated in the forward direction from the first optical fiber 3 on the upstream side, and $\beta$ can be defined as the ratio between the energy of the light thus caused to enter the first optical fiber 3 and the energy measured by the calorimeter.

After the calculation unit 25 calculates Pf and Pr, where Pf is the intensity of the light in the forward direction and Pr is the intensity of the light in the reverse direction as described above, the control unit CP can perform predetermined control over the laser device 1 on the basis of the calculation result. For example, the control unit CP can perform control to adjust the output from the light source 2 in accordance with Pf, which is the intensity of the light in the forward direction, or perform control to intercept the light emitted from the laser device 1 when Pf, which is the intensity of the light in the reverse direction, exceeds an allowable value. In addition, the control unit CP may cause a display device (not illustrated) to show a warning or may cause a speaker (not illustrated) to produce a warning sound.

As described above, the photodetection device 4 of the present embodiment includes the plurality of first optical fibers 3, the optical combiner 10 having one end face to which one end face of each of the first optical fibers 3 is connected, and the second optical fiber 5 having one end face to which the other end face of the optical combiner 10 is connected. The photodetection device 4 of the present embodiment further includes the first photodetector 21 that detects the intensity of the light propagating through one of the first optical fibers 3, the second photodetector 22 that detects Rayleigh scattering of the light propagating through the second optical fiber 5, and the calculation unit 25.

In the photodetection device 4 of the present embodiment, when the plurality of first optical fibers 3 and the second optical fiber 5 are optically coupled via the optical combiner 10, a difference arises between the ratio of the light propagating from the plurality of the first optical fibers 3 to the second optical fiber 5 and the ratio of the light propagating from the second optical fiber 5 to the plurality of the first optical fibers 3. In other words, it is easier to propagate light from an end face of the optical combiner 10, the end face being connected to the second optical fiber 5, to the core 51 of the second optical fiber 5, whereas it is more difficult to propagate light from an end face of the optical combiner 10, the end face being connected to the first optical fibers 3, to the cores 31 of the first optical fibers 3. This is conceivably because, in the case where the plurality of first optical fibers 3 is connected to an end face of the optical combiner 10, the light coming from the second optical fiber 5 side is incident on a gap between the adjacent first optical fibers 3 on the end face of the optical combiner 10 and on the claddings 32 of the first optical fibers 3.

Meanwhile, the first photodetector 21 of the present embodiment detects the intensity of the light propagating through one of the first optical fibers 3. In the case where light propagates through the plurality of first optical fibers 3, if the intensity of the light propagating through at least one of the first optical fibers 3 is known, the intensity of the light propagating through the plurality of the first optical fibers 3 can be estimated by totalizing the intensities. The second photodetector 22 detects the intensity of the light propagating through the second optical fiber 5 by detecting Rayleigh scattering of the light propagating through the second optical fiber 5. Because of the aforementioned difference between the ratios, a difference in detection result arises between the first photodetector 21 and the second photodetector 22, which are placed to sandwich the optical combiner 10 as described above. The difference in detection result is dependent on the intensity of the light propagating from the first optical fibers 3 toward the second optical fiber 5 and on the intensity of the light propagating from the second optical fiber 5 toward the first optical fibers 3. Therefore, as described above, the calculation unit 25 can calculate the intensity of the light propagating from the first optical fibers 3 toward the second optical fiber 5 or the intensity of the light propagating from the second optical fiber 5 toward the first optical fibers 3, from the result of detection by the first photodetector 21 and the result of detection by the second photodetector 22. That is, calculation unit 25 can calculate the intensity of the light propagating through the first optical fibers 3 or through the second optical fiber 5 in a predetermined direction.

In addition, in the photodetection device 4 of the present embodiment, at least the second photodetector 22 detects Rayleigh scattering. Therefore, as compared with the case where leaked light is detected as in the fiber laser device described in Patent Literature 1 above, the relationship between a detection result and an intensity of light propagating through the second optical fiber 5 estimated from the detection result can be kept linear even when the light propagating through the second optical fiber 5 has a high intensity. Note that the method for detecting the intensity of the light propagating through the first optical fiber 3 by using the first photodetector 21 is not particularly limited. Thus, for example, the first photodetector 21 may detect Rayleigh scattering of the light propagating through the first optical fiber 3, or may directly detect the light branched from the first optical fiber 3. The light propagating through the plurality of first optical fibers 3 is incident on the second optical fiber 5, whereas the light propagating through each of the first optical fibers 3 has a lower intensity than the light propagating through the second optical fiber 5. Accordingly, even in the case where, for example, the first photodetector 21 detects leaked light, the relationship between a detection result and an intensity of light propagating through the first optical fiber 3 estimated from the detection result is more likely to be kept linear. Therefore, the photodetection device 4 of the present embodiment can improve the accuracy of detecting the intensity of light propagating through an optical fiber in a predetermined direction.

Furthermore, in the photodetection device 4 of the present embodiment, the cladding mode stripper 55 is provided on the second optical fiber 5, and the second photodetector 22 is disposed closer to the optical combiner 10 than the cladding mode stripper 55. The ratio of the cladding mode light to the light that is emitted from the second optical fiber 5 and returns to the second optical fiber 5 is indefinite, and thus the cladding mode light may constitute an uncertainty in a result of detection by the second photodetector 22. Since the second photodetector 22 is provided closer to the optical combiner 10 than the cladding mode stripper 55, the cladding mode light out of the light that is emitted from the second optical fiber 5 and returns to the second optical fiber 5 can be released to the outside of the second optical fiber 5 by the cladding mode stripper 55. Therefore, it can be easier for the second photodetector 22 to accurately detect the intensity of the light propagating through the second optical fiber 5.

Furthermore, the laser device 1 of the present embodiment includes the above-described photodetection device 4 and the light source 2 that emits light to be incident on the other end face of each of the first optical fibers 3. As described above, the photodetection device 4 of the present embodiment can improve the accuracy of detecting the intensity of light propagating through an optical fiber in a predetermined direction. Therefore, the laser device 1 equipped with the photodetection device 4 of the present embodiment can improve the accuracy of the control based on the intensity of light propagating through an optical fiber.

Second Embodiment

Figure 4:
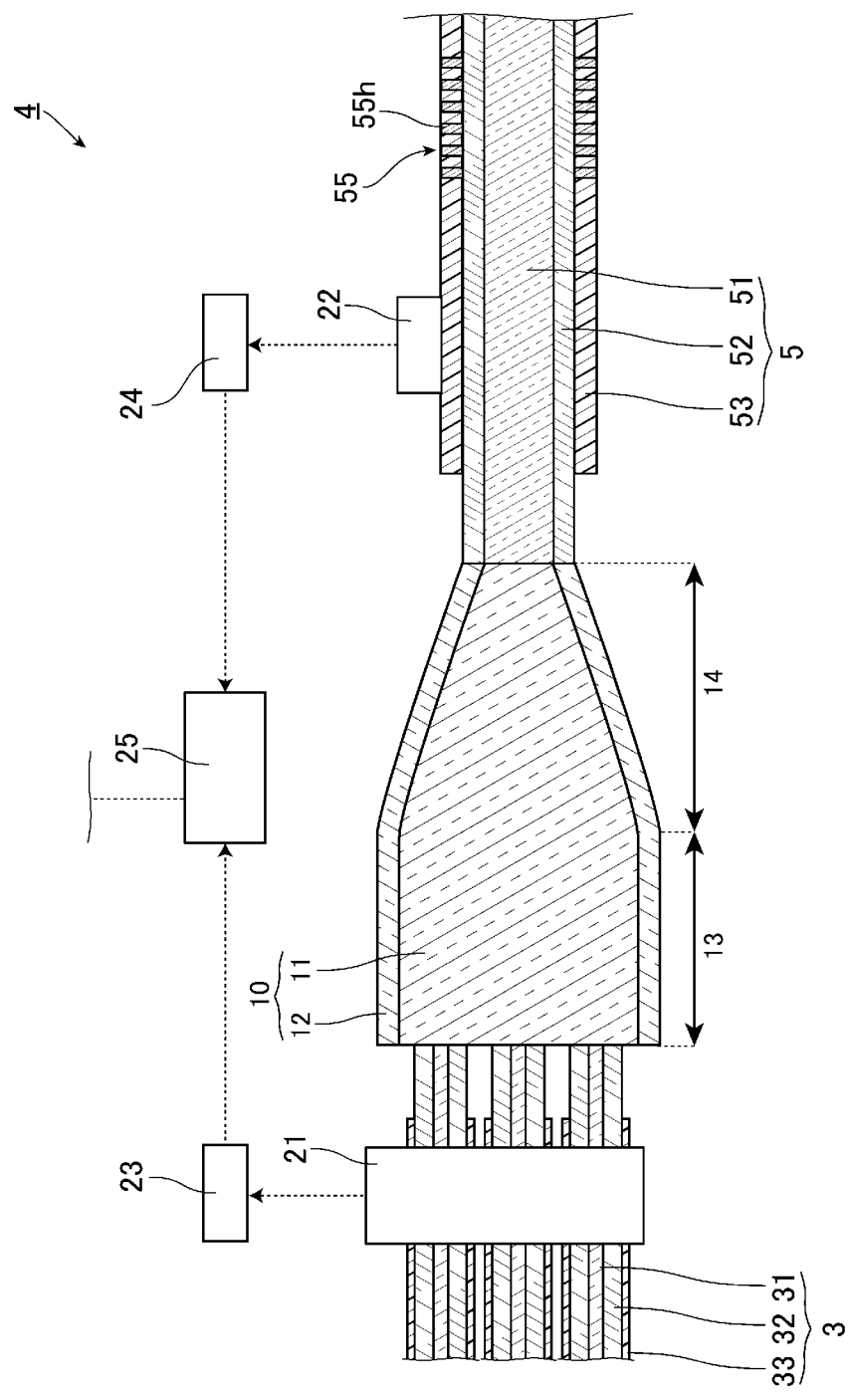
FIG. 4 is a diagram illustrating a photodetection device according to a second embodiment of the present invention in a similar manner to FIG. 3.

The following describes a second embodiment of the present invention in detail with reference to FIG. 4. Note that unless otherwise specified, the same reference numerals are given to the components identical or equivalent to the components in the first embodiment, and duplicate description is omitted.

FIG. 4 is a diagram illustrating a photodetection device according to the second embodiment of the present invention in a similar manner to FIG. 3. As shown in FIG. 4, the photodetection device 4 of the present embodiment is different from the photodetection device 4 of the first embodiment in that the first photodetector 21 detects the intensity of the light propagating through all the first optical fibers 3.

As in the first embodiment above, the intensity of the light propagating through the plurality of first optical fibers 3 can be estimated by detecting the intensity of the light propagating through at least one of the first optical fibers 3, the detecting being performed by the first photodetector 21. However, in the case where light propagates through the plurality of first optical fibers 3, the first photodetector 21 detecting the intensity of the light propagating through all the first optical fibers 3 eliminates the need for estimating the intensity of the light propagating through the plurality of first optical fibers 3 as described above, and it is made easier to detect the intensity of the light propagating through the plurality of first optical fibers 3. In addition, if the first optical fiber 3 is very thin relative to the size of the sensor used as the first photodetector 21, arranging the plurality of first optical fibers in parallel allows a single sensor to detect the intensity of the light propagating through all the first optical fibers 3, and the sensor can be disposed easily.

Note that in the present embodiment, the first photodetector 21 detects the intensity of the light propagating through all the first optical fibers 3, and therefore calculations can be done in accordance with the equations (1) to (7) with N=1 assuming that Pf represents the total intensity of the light propagating through all the first optical fibers 3.

Third Embodiment

Figure 5:
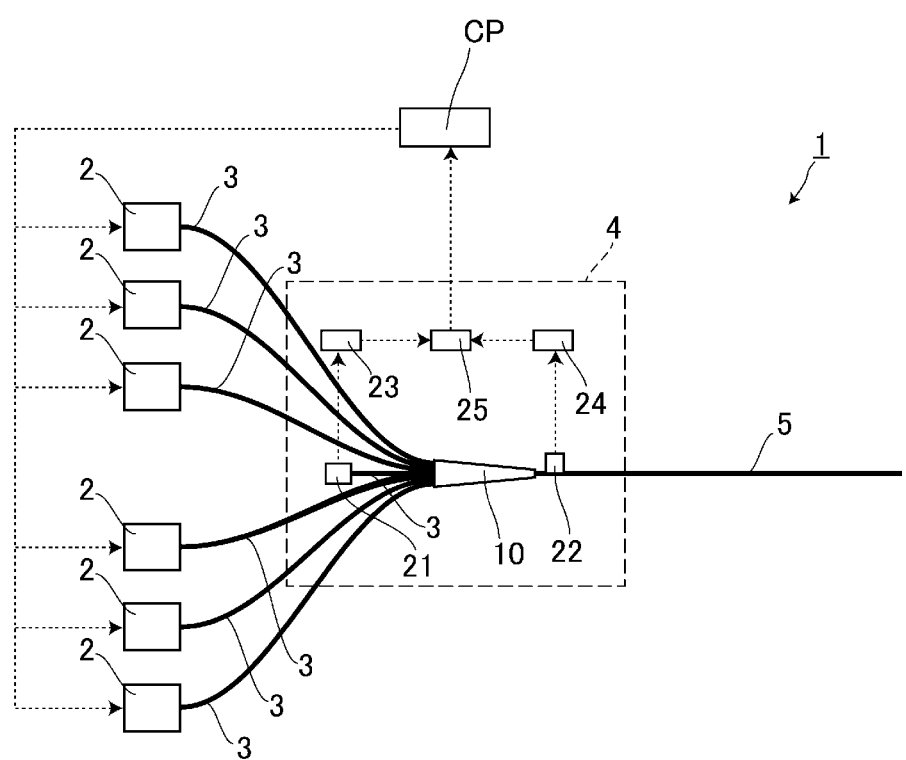
FIG. 5 is a diagram illustrating a laser device according to a third embodiment of the present invention in a similar manner to FIG. 1.

The following describes a third embodiment of the present invention in detail with reference to FIG. 5. Note that unless otherwise specified, the same reference numerals are given to the components identical or equivalent to the components in the first embodiment, and duplicate description is omitted.

FIG. 5 is a diagram illustrating a laser device according to the third embodiment of the present invention in a similar manner to FIG. 1. As shown in FIG. 5, in the photodetection device 4 included in the laser device 1 of the present embodiment, the light source 2 is optically coupled to the other end face of each of some first optical fibers 3 among the plurality of first optical fibers 3, while the light source 2 is non-connected to the other end face of each of some other first optical fibers 3 among the plurality of the first optical fibers 3. The first photodetector 21 detects the intensity of the light propagating through the first optical fiber 3 that is non-connected to the light source 2.

FIG. 5 illustrates an example in which the light source 2 is non-connected to the other end face of the first optical fiber 3 that is connected to the center of the core 11 of the optical combiner 10, while the light source 2 is connected to the other end face of each of the other first optical fibers 3. However, the light source 2 may be non-connected to the other end face of each of the first optical fibers 3 other than the first optical fiber 3 that is connected to the center of the core 11 of the optical combiner 10, or the light source 2 may be non-connected to the other end face of each of a plurality of first optical fibers 3.

In the case where the light source 2 is optically coupled to the other end face of each of some first optical fibers 3 among the plurality of first optical fibers 3, when the light source 2 emits light, only the light coming from the second optical fiber 5 side is propagated through the first optical fiber 3 that is non-connected to the light source 2. In this case, the second photodetector 22 detects the intensity of the light propagating in both directions through the second optical fiber 5, whereas the first photodetector 21 detects the intensity of the light propagating from the second optical fiber 5 side through the first optical fiber 3. In other words, in the present embodiment, calculations can be done in accordance with the aforementioned equation (2) width Pf=0. Therefore, it is made easier to calculate the intensity of the light propagating in a predetermined direction through the first optical fiber 3 and the second optical fiber 5, from a difference between a result of detection by the first photodetector 21 and a result of detection by the second photodetector 22.

The first photodetector 21 of the present embodiment detects the intensity of the light emitted from the other end face of the first optical fiber 3 that is non-connected to the light source 2. In this case, the first photodetector 21 is, for example, a photodiode that directly detects the light emitted from the other end face of the first optical fiber 3. Through detection of the intensity of the light emitted from the end face of the first optical fiber 3, it is made easier to accurately detect the intensity of the light propagating from the second optical fiber 5 side through the first optical fiber 3.

The present invention has been described above by taking the embodiments as examples, but the present invention is not limited to these embodiments.

For example, in the embodiments described above, the light emitted from the light source 2 propagates through every first optical fiber 3 that is connected to the light source 2. However, the light sources 2 each may be optically coupled to the other end face of each of the first optical fibers 3, and each light source 2 may be switched between the light emission state and the light non-emission state. Then, the plurality of first optical fibers 3 is switched between the state in which light is propagated toward the optical combiner 10 and the state in which light is not propagated. That is, each of the plurality of light sources 2 may be individually controlled to emit light or stop emitting light and, among the first optical fibers 3 respectively connected to the light sources 2, the light from the light sources 2 may propagate through some first optical fibers 3 and need not propagate through some other first optical fibers 3. In this case, the first photodetector 21 detects, when at least one of the light sources 2 is emitting light, the intensity of the light propagating through the first optical fiber 3 optically coupled to the light source 2 that is in the light non-emission state. In other words, the first photodetector 21 detects the intensity of the light propagating through the first optical fiber 3 that is not propagating light toward the optical combiner 10. In order to detect the intensity of the light propagating through the first optical fiber 3 in this way, the first photodetector 21 for detecting the intensity of the light propagating through the first optical fiber 3 is disposed, for example, for each of the first optical fibers 3. Then, among the plurality of first photodetectors 21, the first photodetectors 21 for detecting the intensity of the light propagating through the first optical fibers 3 optically coupled to the light sources 2 that are in the light non-emission state are only activated. In this case, the first photodetector 21 detects Rayleigh scattering of the light propagating through the first optical fiber 3.

As described above, among the plurality of first optical fibers 3, some first optical fibers 3 are switched to the state in which light is propagated toward the optical combiner 10 and some other first optical fibers 3 are switched to the state in which light is not propagated toward the optical combiner 10. In this case, only the light from the second optical fiber 5 propagates through the first optical fiber 3 that is not propagating any light toward the optical combiner 10. Through detection of the intensity of the light propagating through the first optical fiber 3 that is not propagating any light toward the optical combiner 10, the detection being performed by the first photodetector 21, the first photodetector 21 detects the intensity of the light propagating from the second optical fiber 5 side through the first optical fiber 3. Therefore, as in the third embodiment, it is made easier to calculate the intensity of the light propagating in a predetermined direction through the first optical fiber 3 and the second optical fiber 5, from a difference between a result of detection by the first photodetector 21 and a result of detection by the second photodetector 22.

In addition, the number of the first optical fibers 3 connected to one end face of the optical combiner 10 is not particularly limited as long as the number is two or more. The first photodetector 21 is only needed to detect the intensity of the light propagating through at least one of the first optical fibers 3.

Furthermore, in the examples described in the embodiments above, the cladding mode stripper 55 is provided on the second optical fiber 5, and the second photodetector 22 is disposed closer to the optical combiner 10 than the cladding mode stripper 55. However, the cladding mode stripper may be provided on the second optical fiber 5 closer to the optical combiner 10 than the second photodetector 22, or may be provided on the first optical fiber 3.

As described above, the present invention provides a photodetection device and a laser device that can improve the accuracy of detecting the intensity of light propagating through an optical fiber in a predetermined direction, and the photodetection device and the laser device are expected to be used in the fields of fiber laser devices, optical fiber communications, and so on.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . Laser device
2 . . . Light source
3 . . . First optical fiber
4 . . . Photodetection device
5 . . . Second optical fiber
10 . . . Optical combiner
21 . . . First photodetector
22 . . . Second photodetector
25 . . . Calculation unit
CP . . . Control unit

The invention claimed is:

1. A photodetection device comprising:
   first optical fibers;
   a second optical fiber;
   an optical combiner having:
      an end face connected to an end face of each of the first optical fibers; and
      another end face connected to an end face of the second optical fiber;
   a first photodetector that detects an intensity of light propagating through at least one of the first optical fibers;
   a second photodetector that detects Rayleigh scattering of light propagating through the second optical fiber; and
   a calculator that calculates the intensity of light propagating in a predetermined direction through the first optical fibers or the second optical fiber, from a result of detection by the first photodetector and a result of detection by the second photodetector,
   wherein
   some, but not all, of the first optical fibers each have another end face that is optically coupled to a light source, and
   the first photodetector detects the intensity of the light propagating through the first optical fibers that are not optically coupled to the light source.

2. The photodetection device according to claim 1, wherein
   the first photodetector detects the intensity of the light emitted from the another end face of each of the first optical fibers that is not optically coupled to the light source.

3. The photodetection device according to claim 1, wherein
   each of the first optical fibers has another end face that is optically coupled to a respective light source,
   each of the light sources is switched between a light emission state and a light non-emission state, and
   the first photodetector detects, when at least one of the light sources is in the light emission state, the intensity of the light propagating through the first optical fibers optically coupled to the light sources that are in the light non-emission state.

4. The photodetection device according to claim 1, wherein
   a cladding mode stripper is disposed on a portion of the second optical fiber, and
   the second photodetector is disposed closer to the optical combiner than the cladding mode stripper.

5. A laser device comprising:
   the photodetection device according to claim 1; and
   a light source that emits light to be incident on another end face of at least one of the first optical fibers.

* * * * *